(12) United States Patent
Feuerstein et al.

(10) Patent No.: US 12,607,214 B2
(45) Date of Patent: Apr. 21, 2026

(54) FURNITURE FITTING

(71) Applicant: Julius Blum GmbH, Hoechst (AT)

(72) Inventors: Markus Feuerstein, Gaissau (AT);
Markus Irgang, Altach (AT)

(73) Assignee: JULIUS BLUM GMBH, Hoechst (AT)

( * ) Notice: Subject to any disclaimer, the term of this patent is extended or adjusted under 35 U.S.C. 154(b) by 1641 days.

(21) Appl. No.: 16/944,980

(22) Filed: Jul. 31, 2020

(65) Prior Publication Data

US 2020/0362896 A1 Nov. 19, 2020

Related U.S. Application Data

(63) Continuation of application No. PCT/AT2019/060015, filed on Jan. 16, 2019.

(30) Foreign Application Priority Data

Feb. 1, 2018 (AT) .............................. A 50101/2018

(51) Int. Cl.
| | |
|---|---|
| *F16B 12/20* | (2006.01) |
| *A47B 95/00* | (2006.01) |
| *F16B 12/10* | (2006.01) |

(52) U.S. Cl.
CPC .... *F16B 12/2009* (2013.01); *A47B 2095/006* (2013.01); *A47B 2230/0033* (2013.01); *F16B 2012/103* (2013.01)

(58) Field of Classification Search
CPC ...... F16B 12/10; F16B 12/20; F16B 12/2009; F16B 12/2027; F16B 12/24; F16B 12/26;
(Continued)

(56) References Cited

U.S. PATENT DOCUMENTS

| | | | |
|---|---|---|---|
| 4,131,376 A | 12/1978 | Busse | |
| 4,749,170 A * | 6/1988 | Ase | B28B 23/0056 |
| | | | 52/848 |

(Continued)

FOREIGN PATENT DOCUMENTS

| | | | | |
|---|---|---|---|---|
| AT | 398815 B | * 12/1994 | ............. | A47B 95/00 |
| CN | 2177137 | 9/1994 | | |

(Continued)

OTHER PUBLICATIONS

International Search Report issued Feb. 26, 2019 in International (PCT) Application No. PCT/AT2019/060015.

*Primary Examiner* — Amber R Anderson
*Assistant Examiner* — Kevin J Baynes
(74) *Attorney, Agent, or Firm* — Wenderoth, Lind & Ponack, L.L.P.

(57) ABSTRACT

A furniture fitting for connecting two furniture parts includes a dowel for fastening the furniture fitting to one of the two furniture parts, and an expansion element mounted for movement relative to the dowel. The dowel can be transferred from a first release position into a clamping position by a relative movement of the expansion element. A fitting body has a connecting device for connecting the furniture fitting to the other of the two furniture parts, the fitting body being connected to the expansion element such that the dowel can be moved from the first release position into the clamping position by a rotational or pivoting movement of the fitting body in a first actuation direction. The dowel can be moved from the clamping position into a second release position by a continuation of the rotational or pivoting movement of the fitting body in the first actuation direction.

15 Claims, 10 Drawing Sheets

(58) Field of Classification Search

CPC .......... F16B 12/32; F16B 12/36; F16B 12/38; F16B 2012/103; F16B 2012/2018; A47B 2095/006; A47B 2230/0029; A47B 2230/0033; A47B 2230/0037; A47B 2230/0051; A47B 2230/07; Y10S 403/12; Y10S 403/13

See application file for complete search history.

(56) References Cited

U.S. PATENT DOCUMENTS

| | | | |
|---|---|---|---|
| 4,815,796 A * | 3/1989 | Rock .................... | A47B 88/931 |
| | | | 312/263 |
| 5,156,508 A | 10/1992 | Grisley | |
| 5,611,637 A | 3/1997 | Brüstle et al. | |
| 5,895,103 A | 4/1999 | Huber | |
| 6,361,241 B1 * | 3/2002 | Ferrari ..................... | E05D 5/08 |
| | | | 403/279 |
| 7,246,778 B2 | 7/2007 | Caveney et al. | |
| 7,752,730 B2 | 7/2010 | Caveney et al. | |
| 7,866,928 B2 | 1/2011 | Schmitz | |
| 7,992,279 B2 | 8/2011 | Caveney et al. | |
| 8,137,039 B2 * | 3/2012 | Liang .................... | E05D 5/0276 |
| | | | 292/257 |
| 8,474,765 B2 | 7/2013 | Caveney et al. | |
| 8,801,123 B2 * | 8/2014 | Kueng ................... | A47B 88/95 |
| | | | 312/265.5 |
| 9,016,975 B2 * | 4/2015 | Raich ........................ | E05D 5/08 |
| | | | 403/322.4 |
| 9,161,624 B2 | 10/2015 | Haemmerle | |
| 9,939,001 B2 | 4/2018 | Deman et al. | |

| | | | |
|---|---|---|---|
| 2002/0111094 A1 | 8/2002 | Jensen et al. | |
| 2004/0218970 A1 | 11/2004 | Caveney et al. | |
| 2007/0274773 A1 | 11/2007 | Caveney et al. | |
| 2008/0029667 A1 | 2/2008 | Schmitz | |
| 2010/0232873 A1 | 9/2010 | Caveney et al. | |
| 2011/0268496 A1 | 11/2011 | Caveney et al. | |
| 2013/0293079 A1 | 11/2013 | Haemmerle | |
| 2015/0252831 A1 | 9/2015 | Deman et al. | |
| 2017/0175789 A1 | 6/2017 | Mätzler | |

FOREIGN PATENT DOCUMENTS

| | | | | |
|---|---|---|---|---|
| CN | 1765041 | 4/2006 | | |
| CN | 203609053 | 5/2014 | | |
| CN | 104603476 | 3/2017 | | |
| DE | 295 18 690 | 3/1996 | | |
| DE | 296 05 547 | 7/1996 | | |
| DE | 298 06 466 | 8/1998 | | |
| DE | 19830740 | 1/2000 | | |
| DE | 10 2005 001 564 | 8/2005 | | |
| DE | 20 2015 008 847 | 5/2017 | | |
| DE | 20 2017 102 763 | 7/2017 | | |
| EP | 0 296 961 | 12/1988 | | |
| EP | 0 698 357 | 10/1998 | | |
| EP | 0755640 | 12/1998 | | |
| EP | 3401556 B1 * | 1/2020 | ............. | A47B 88/95 |
| GB | 2277787 A * | 11/1994 | ............. | F16B 12/20 |
| JP | 8-74822 | 3/1996 | | |
| JP | 2014-507967 | 4/2014 | | |
| TW | 201100648 | 1/2011 | | |
| WO | 97/16090 | 5/1997 | | |
| WO | 2009/103761 | 8/2009 | | |
| WO | WO-2012089021 A1 * | 7/2012 | ............. | F16B 12/20 |

* cited by examiner

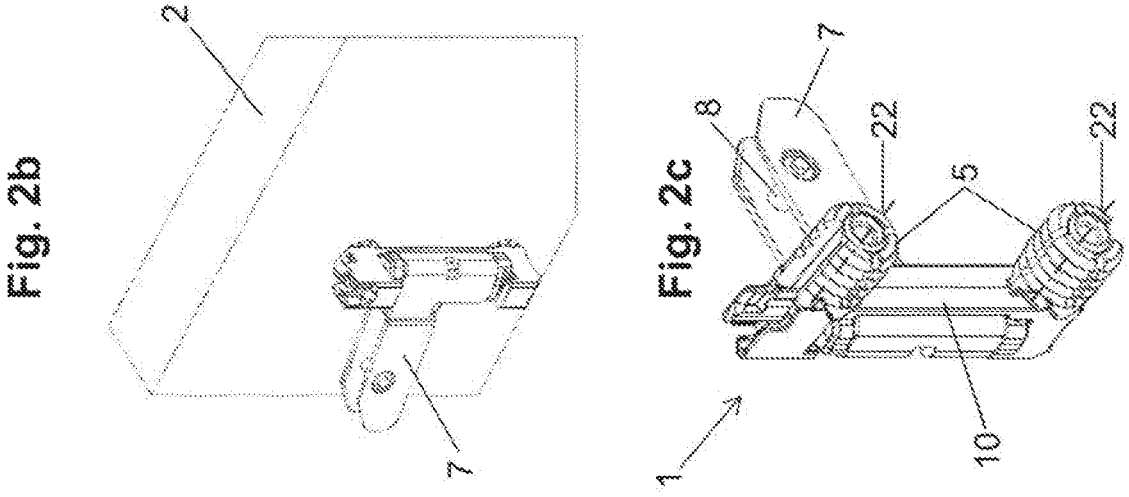
Fig. 2b
Fig. 2c
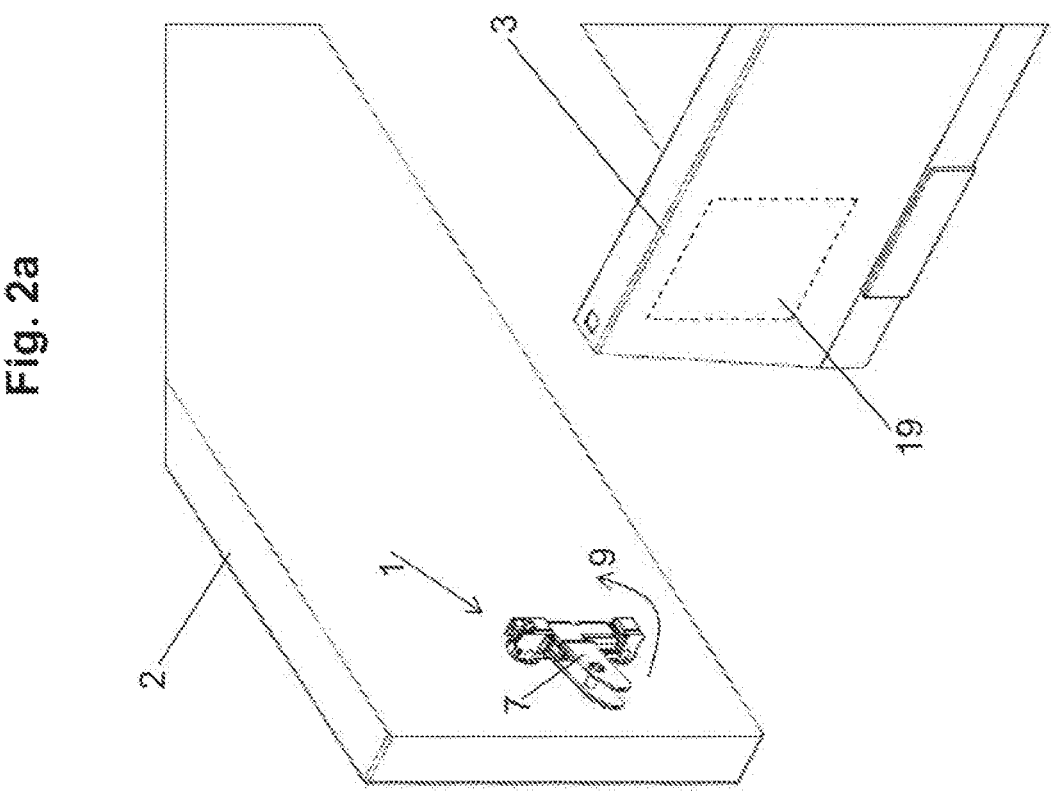
Fig. 2a

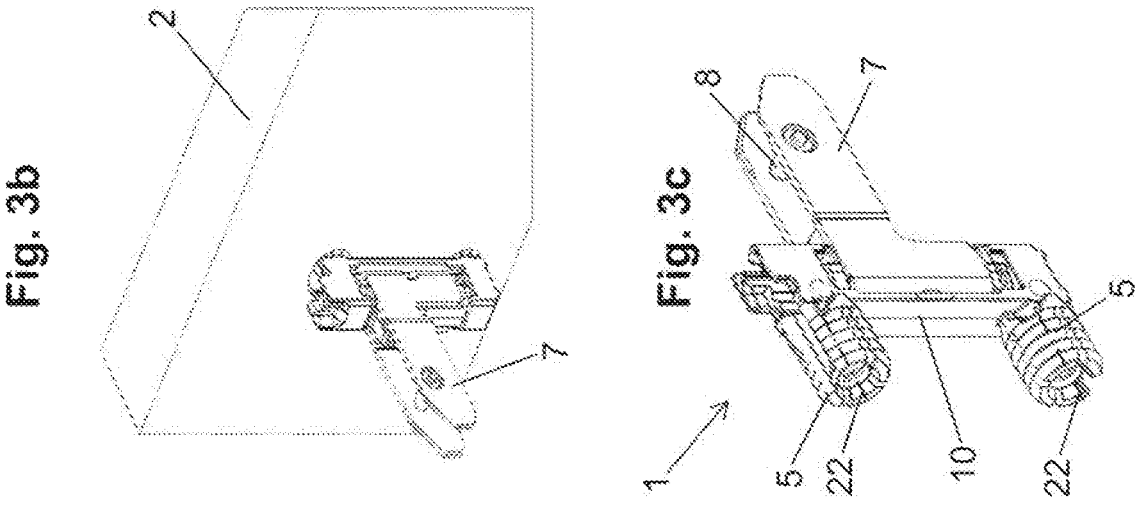
Fig. 3b
Fig. 3c
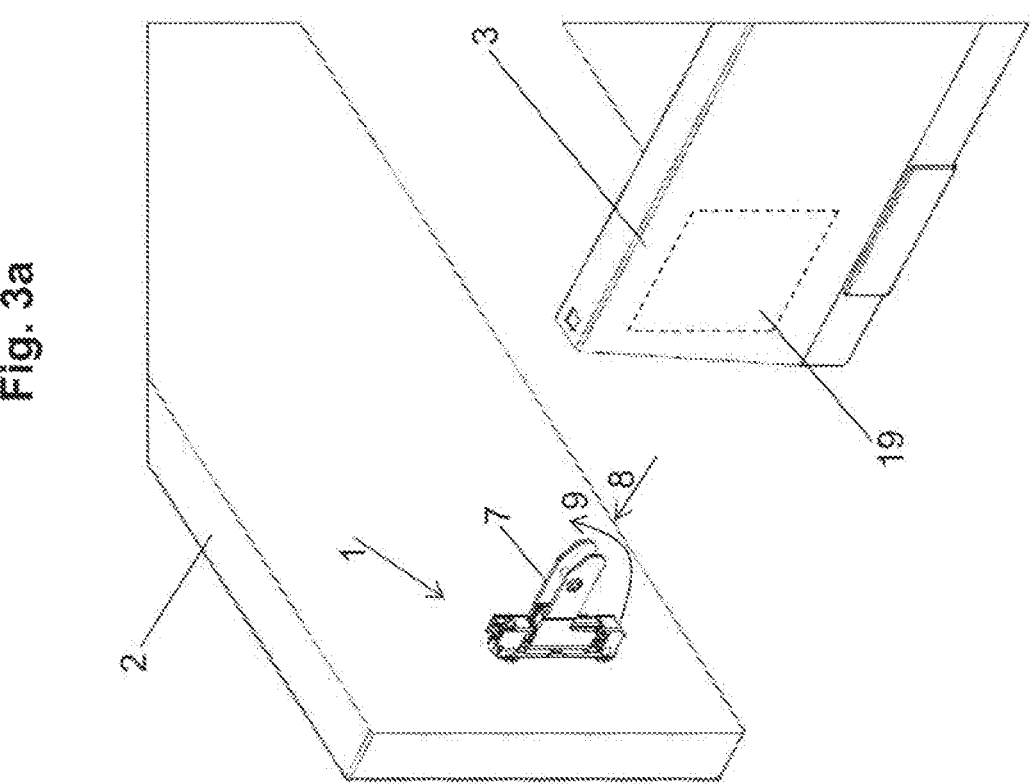
Fig. 3a

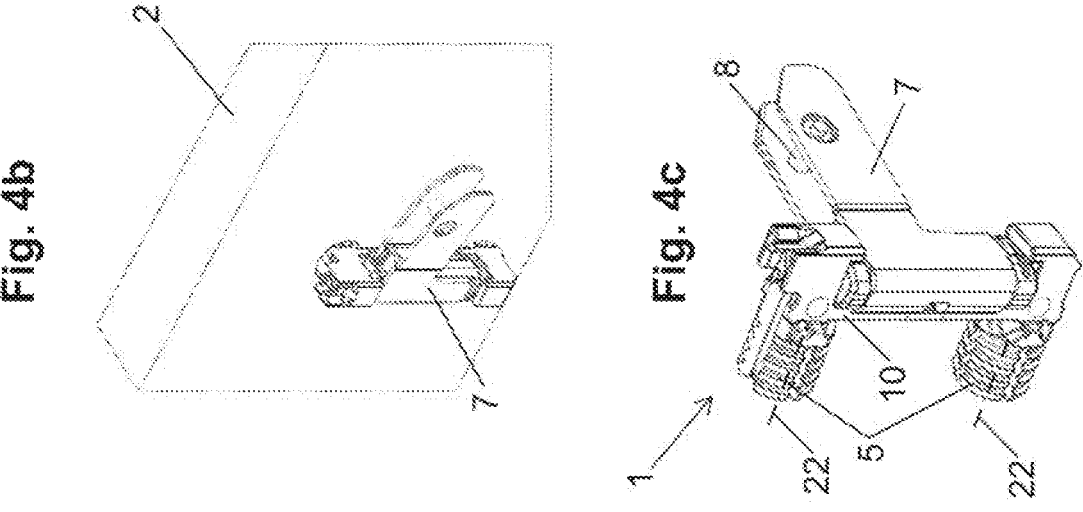
Fig. 4b
Fig. 4c
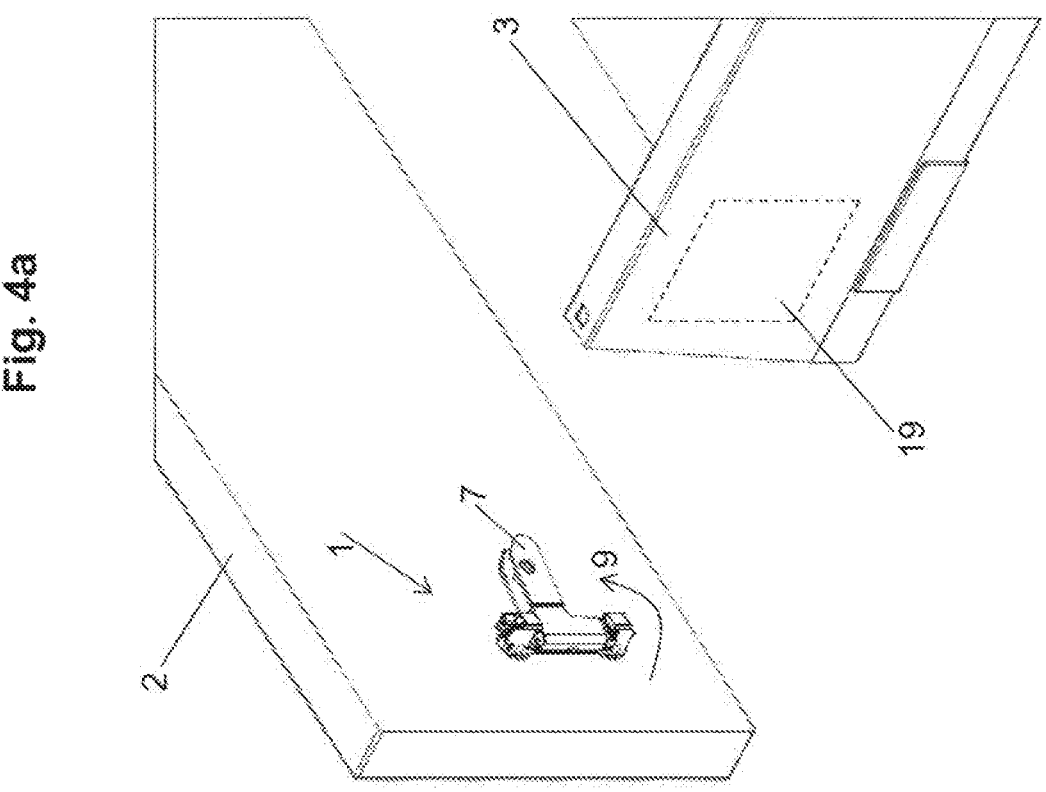
Fig. 4a

Fig. 5

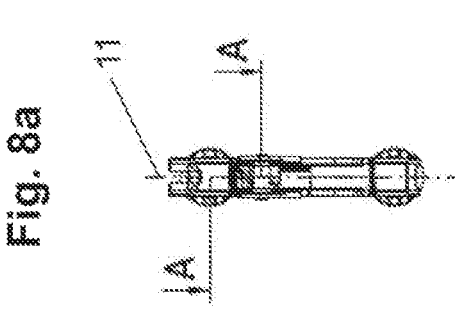
Fig. 7a
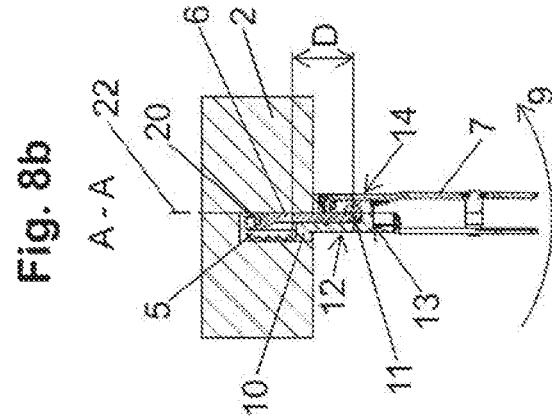
Fig. 8a
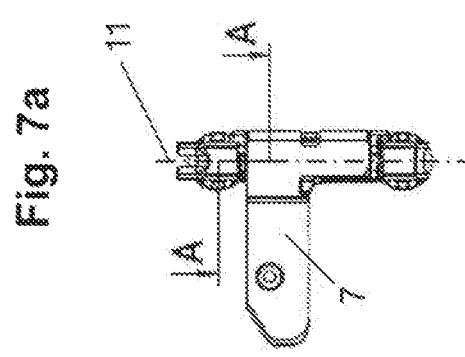
Fig. 9a
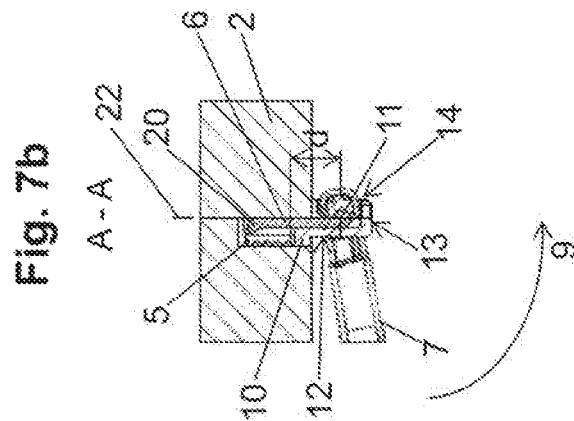
Fig. 7b
A - A
Fig. 8b
A - A
Fig. 9b
A - A

Figures 11A, 11B, 11C:
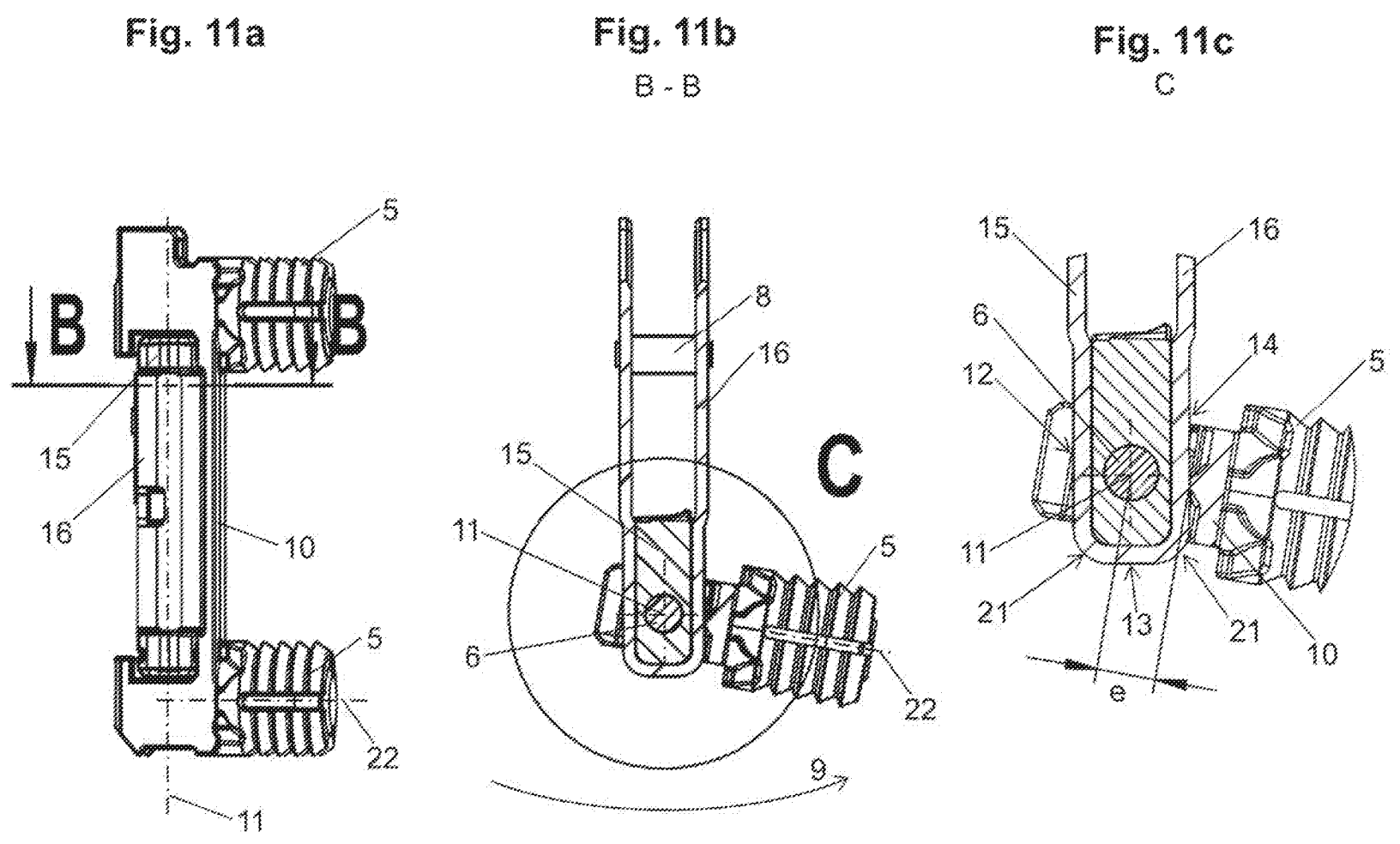

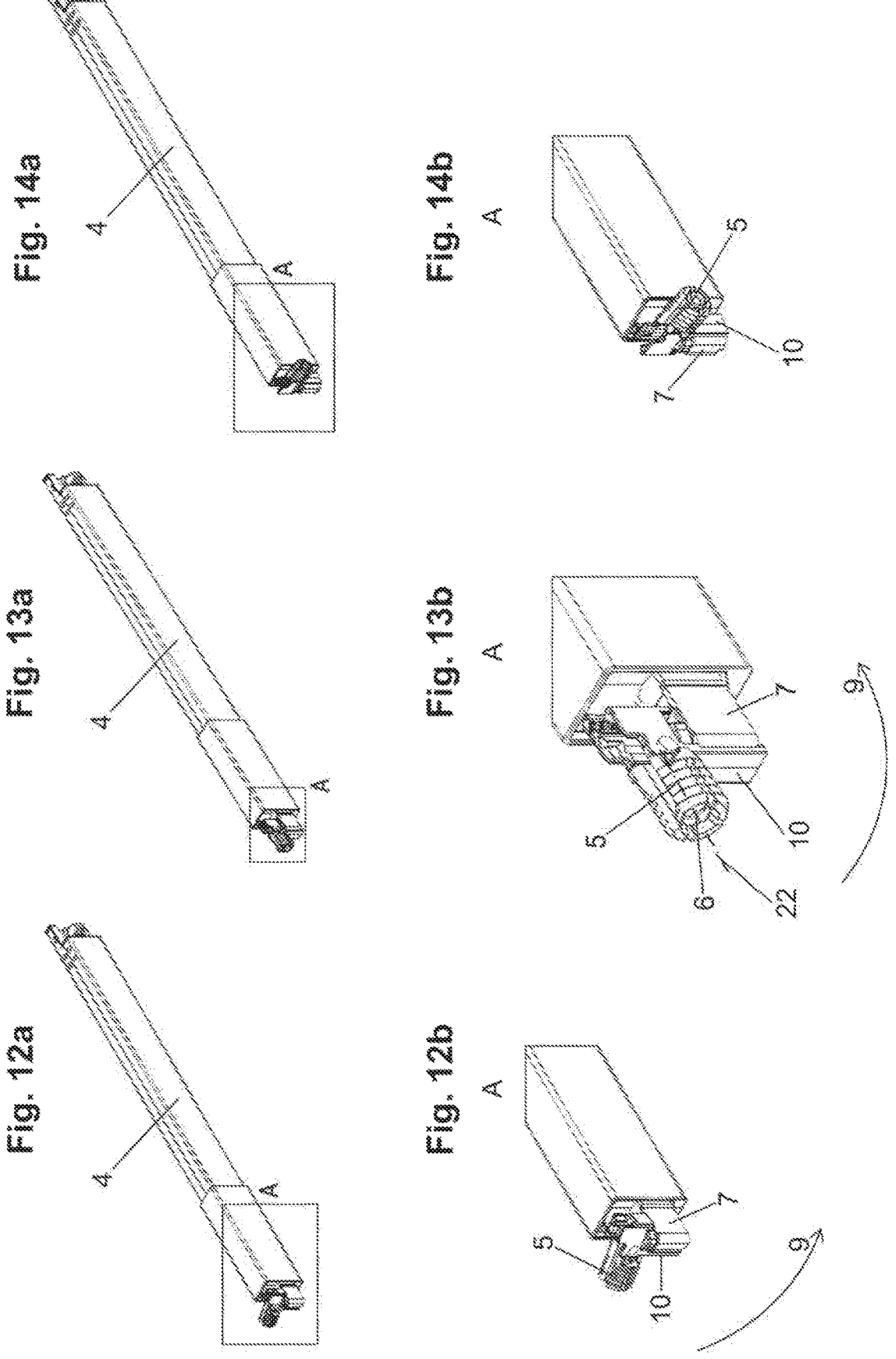

FURNITURE FITTING

BACKGROUND OF THE INVENTION

The present invention concerns a furniture fitting for connecting two furniture parts, and an article of furniture having at least two furniture parts which are connected together by at least one furniture fitting.

Such a furniture fitting for connecting two furniture parts is disclosed in EP 0698357 B1. In that case the furniture fitting described therein has a dowel for fixing the furniture fitting to one of the furniture parts. There is also a spreader element which is mounted movably relative to the dowel, wherein the dowel, starting from a release position, can be transferred into a clamping position by a relative movement of the spreader element. That relative movement of the spreader element relative to the dowel can be implemented by a rotary or pivotal movement of a fitting body, to which the spreader element is fixed. The fitting body, starting from a release position in which the dowel is released, can be rotated or pivoted into a clamping position in which the dowel is clamped. For that purpose the fitting body is rotated or pivoted from a first position (a release position) into a second position (a clamping position), the movement being limited by an abutment. The dowel can be released again by rotating or pivoting the spreader element from the clamping position of the fitting body.

A disadvantage with the known state of the art is that an excessively great force is often applied by a user to move the fitting body from a release position into a clamping position and in that case the abutment is overridden due to the excessive force, whereby the furniture fitting is damaged. It can also happen that, when the fitting body is in a clamping position, an operator would like to release it and in that situation pushes the fitting body in the wrong direction and thus overrides the abutment whereby the furniture fitting is also damaged.

SUMMARY OF THE INVENTION

The object of the present invention is to provide a furniture fitting for connecting two furniture parts in which the above-described disadvantages of the state of the art are avoided.

According to the invention, the furniture fitting is so connected to the at least one spreader element that the at least one dowel is movable from a first release position into the clamping position by a rotary or pivotal movement of the fitting body in a first actuation direction, wherein the at last one dowel is movable from the clamping position into a second release position different from the first release position by continuation of the rotary or pivotal movement of the fitting body in the first actuation direction.

There is the advantage therein that the furniture fitting is releasable in a plurality of directions starting from a clamping position of the at least one dowel and it cannot happen that the furniture fitting suffers damage by virtue of choosing the wrong actuation direction. Furthermore a furniture fitting according to the invention has two release positions, wherein the furniture fitting can be moved into different release positions depending on the respective accessibility to the fixing position.

The at least one dowel can have a central axis and the fitting body in the course of the rotary or pivotal movement is rotatable or pivotable about an axis of rotation, wherein the axis of rotation is arranged transversely, preferably at a right angle, to the central axis.

Preferably, the at least one spreader element—preferably at the free end—has a spreader cam, which spreader cam is arranged in the at least one dowel. In that respect, the at least one dowel is formed by a sleeve which is at least partially slit in its longitudinal direction, wherein the spreader element is arranged in that sleeve, and a spreader cam is disposed at an end of the spreader element. When now that spreader cam is displaced in an axial direction (in the direction of the sleeve interior) then the dowel is spread open with its slit outside surface whereby the dowel is held by surface pressure in a bore in which the dowel is arranged. When now the spreader element is moved back again or the spreader cam is moved out of the interior of the dowel then the sleeve reverts to its initial form (when the dowel is only elastically deformed in its clamping position) and the dowel can be safely removed from the bore again.

Furthermore, the at least one spreader element can be mounted rotatably to the at least one fitting body and is displaceable axially in the at least one dowel.

Particularly preferably, the at least one spreader element is in the form of an L-shaped member of which a first limb is guided axially in the at least one dowel and a second limb is mounted rotatably in the fitting body. In that respect, the radial movement is converted into an axial movement by a rotary or pivotal movement of the fitting body, wherein the axial movement of the spreader element in the at least one dowel leads to clamping or release of the dowel.

Further, the at least one dowel can be connected to a carrier and the at least one spreader element can be mounted to the fitting body rotatably about an axis of rotation. Further, the fitting body can have three contact surfaces, of which a respective one bears against the carrier depending on the respective position of the fitting body and of which at least two are at a different spacing relative to the axis of rotation. Thus, for example, the carrier which bears against a first contact surface of the fitting body can be moved by a rotary or pivotal movement of the fitting body about an axis of rotation to a second contact surface of the fitting body, wherein the two contact surfaces are at a different spacing relative to the axis of rotation and thus the spreader element is guided axially in the dowel by the difference between the different spacings, wherein that axial movement of the spreader element can move the dowel between a release position and a clamping position.

Further preferably, a spacing between an axis of rotation, in which the at least one spreader element is mounted rotatably in the at least one fitting body, and the at least one dowel can be increased or reduced by a rotary or pivotal movement of the fitting body relative to the at least one dowel. By virtue of that increase or reduction in the spacing, as described hereinbefore, it is possible to cause an axial movement of the spreader element which is mounted rotatably in the at least one fitting body in the at least one dowel (in which the spreader element is axially movably mounted).

The furniture fitting can have an at least two-part structure, including a fixing part for fixing the at least one spreader element and a guide part, wherein the guide part bears against the at least one dowel and/or a carrier, the carrier being connected to the at least one dowel. By virtue of such a design configuration, different regions of the fitting body are afforded by differing parts, wherein the different regions of the fitting body are often subject to different demands. Thus, for example, the fitting body can have a fixing part for fixing to the at least one spreader element. The demands made on such a fixing part are often a high level of elasticity in order to withstand the high forces which occur and which are transmitted by the spreader element, without plastic deformation. Further, the fixing part can be made from a softer or harder material than the spreader element. That gives rise to no or lower levels of wear, either on the fixing part or on the spreader element, due to the continuous movement between those two components. Accordingly, the fixing part can be made for example from a plastic and the spreader element from a metal whereby that gives the further advantage that only minimum noise occurs upon a relative movement between the spreader element and the fixing part. Furthermore, therefore the guide part can also be made from a different material from the dowel which bears against same or the carrier which bears against same.

Preferably, the fitting body has a predefined latching position with respect to the dowel at least in the clamping position, preferably also in the first and second release positions. Such a latching position secures the relative position as between the fitting body and the dowel and prevents unwanted movement out of that position. It can thus be provided that the latching position can be implemented by a knob which in the desired position latches into a recess provided for same. However, there can also be eccentric edges relative to an axis of rotation between the individual positions, and those edges have to be overridden in a rotary or pivotal movement of the fitting body with respect to the dowel from a first position into a second position. By virtue of such a configuration the fitting body can latch in place or snap in place at the intended position in a rotary or pivotal movement from a first position into a second position.

Preferably, the fitting body is in the form of a holding part for a front panel of a drawer. Accordingly, the fitting body can be fixed to a front panel and the connecting device for connecting the furniture fitting to a side wall of a drawer, wherein the front panel can be releasably connected to the side wall of the drawer by the connecting device. It is also certainly conceivable that the connecting device is arranged at the front panel and the fixing body at the side wall of the drawer. In the same way it can also be provided that the fitting body is in the form of a holding part for a drawer rail, wherein the fitting body can be fixed to a front panel or a side wall of a drawer and the connecting device to the drawer rail. It can also be provided that the drawer rail has the fitting body and the connecting device is arranged at the front panel or the side wall of the drawer. In the same way it can also be provided that a housing is formed by the furniture fitting for connecting two furniture parts, wherein two respective parts of the housing are connected together by a furniture fitting.

Also, an article of furniture can include at least two furniture parts which can be connected together by at least one furniture fitting according to the invention.

BRIEF DESCRIPTION OF THE DRAWINGS

Various embodiments of the invention are set forth in the Figures and in the associated specific description. In the Figures:

FIG. 2a shows an embodiment of a furniture fitting according to the invention in a first release position in conjunction with a front panel, FIG. 2b is a detail view of the furniture fitting of FIG. 2a in conjunction with a front panel, FIG. 2c is a perspective view of the embodiment of a furniture fitting as shown in FIG. 2a,

4

Figure 6:
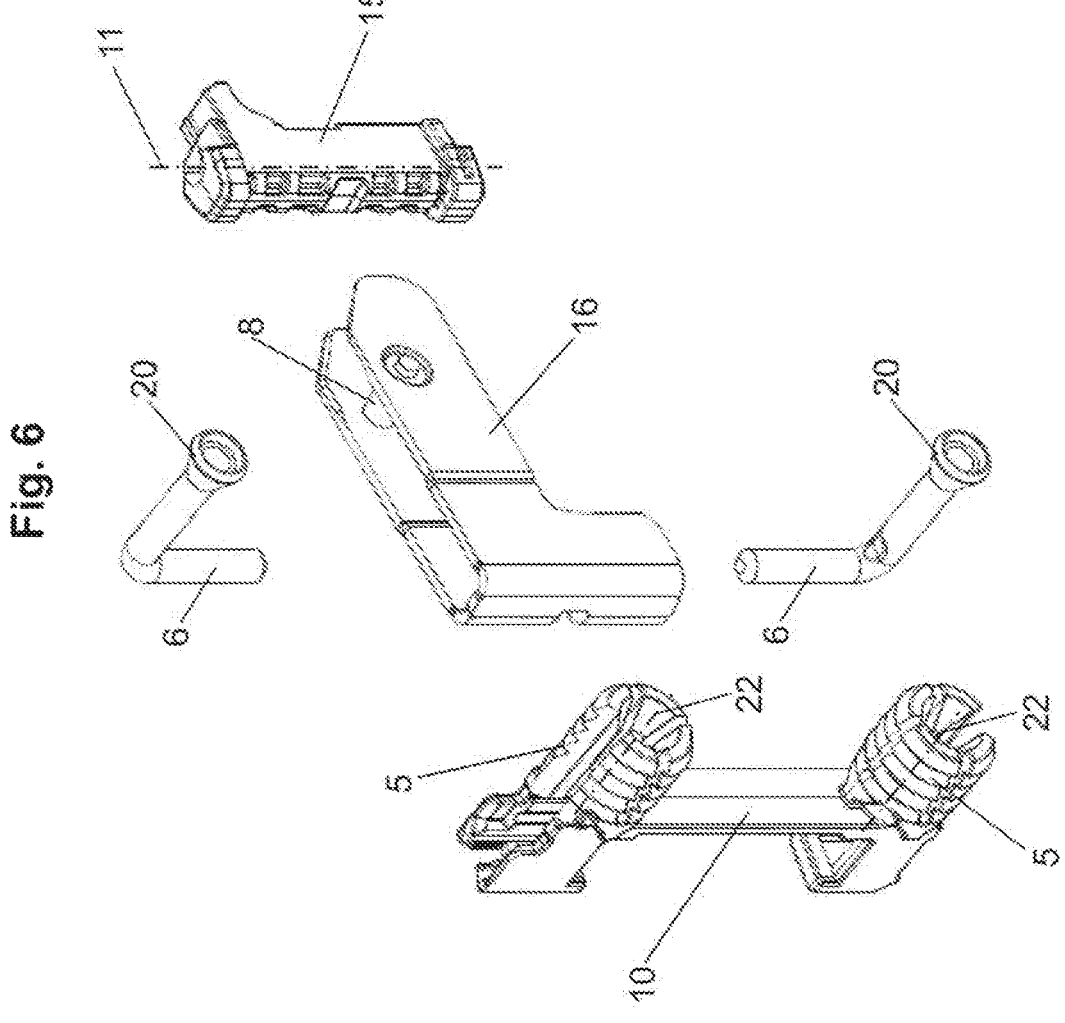
Figure 10C:
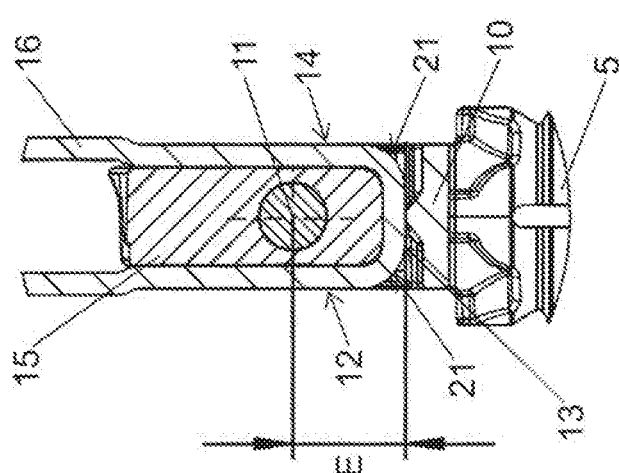
Figure 10B:
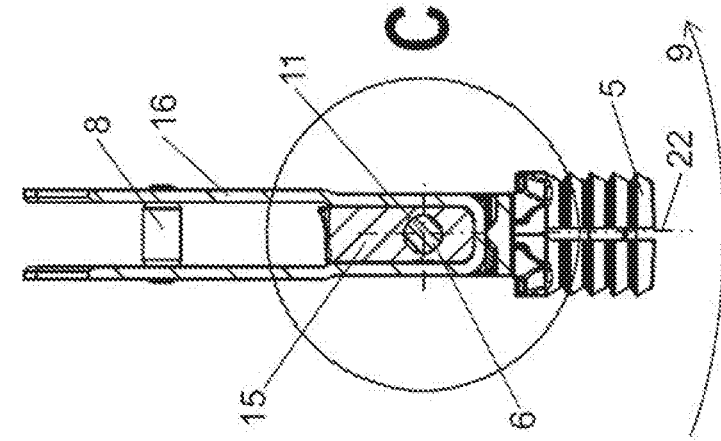
Figure 10A:
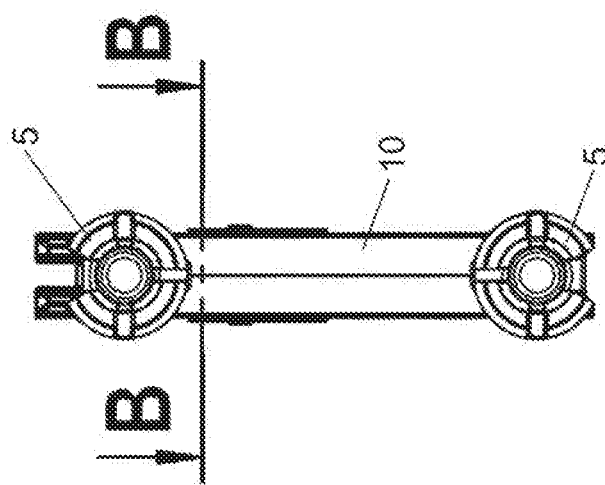

FIG. 3a shows an embodiment of a furniture fitting according to the invention in a clamping position in conjunction with a front panel, FIG. 3b is a detail view of the furniture fitting of FIG. 2a in conjunction with a front panel in a clamping position, FIG. 3c is a perspective view of the FIG. 2a furniture fitting, FIG. 4a shows an embodiment of a furniture fitting according to the invention in a second release position in conjunction with a front panel, FIG. 4b is a detail view of the embodiment of FIG. 4a, FIG. 4c is a perspective view of the embodiment of FIG. 4a, FIG. 5 shows two furniture parts connected by an embodiment of a furniture fitting according to the invention, FIG. 6 is an exploded view of an embodiment of a furniture fitting according to the invention, FIG. 7a shows an embodiment of a furniture fitting according to the invention in a first release position, FIG. 7b is the sectional view indicated in FIG. 7a, FIG. 8a shows the embodiment of FIG. 7a in a clamping position, FIG. 8b is the sectional view indicated in FIG. 8a, FIG. 9a shows the embodiment of FIG. 7a in a second release position, FIG. 9b is the sectional view indicated in FIG. 9a, FIG. 10a shows an embodiment of a furniture fitting according to the invention in a clamping position, FIG. 10b is the sectional view indicated in FIG. 10a, FIG. 10c is the detail view indicated in FIG. 10b, FIG. 11a shows an embodiment of a furniture fitting according to the invention in a release position, FIG. 11b is the sectional view indicated in FIG. 11a, FIG. 11c is the detail view indicated in FIG. 11b, FIG. 12a shows an embodiment of a furniture fitting according to the invention in conjunction with a drawer rail in a first release position, FIG. 12b is the detail view indicated in FIG. 12a, FIG. 13a shows an embodiment of a furniture fitting according to the invention in conjunction with a drawer rail in a clamping position, FIG. 13b is the detail view indicated in FIG. 13a, FIG. 14a shows an embodiment of a furniture fitting according to the invention in conjunction with a drawer rail in a second release position, and FIG. 14b is the detail view indicated in FIG. 14a.

DETAILED DESCRIPTION OF THE INVENTION

Figure 1:
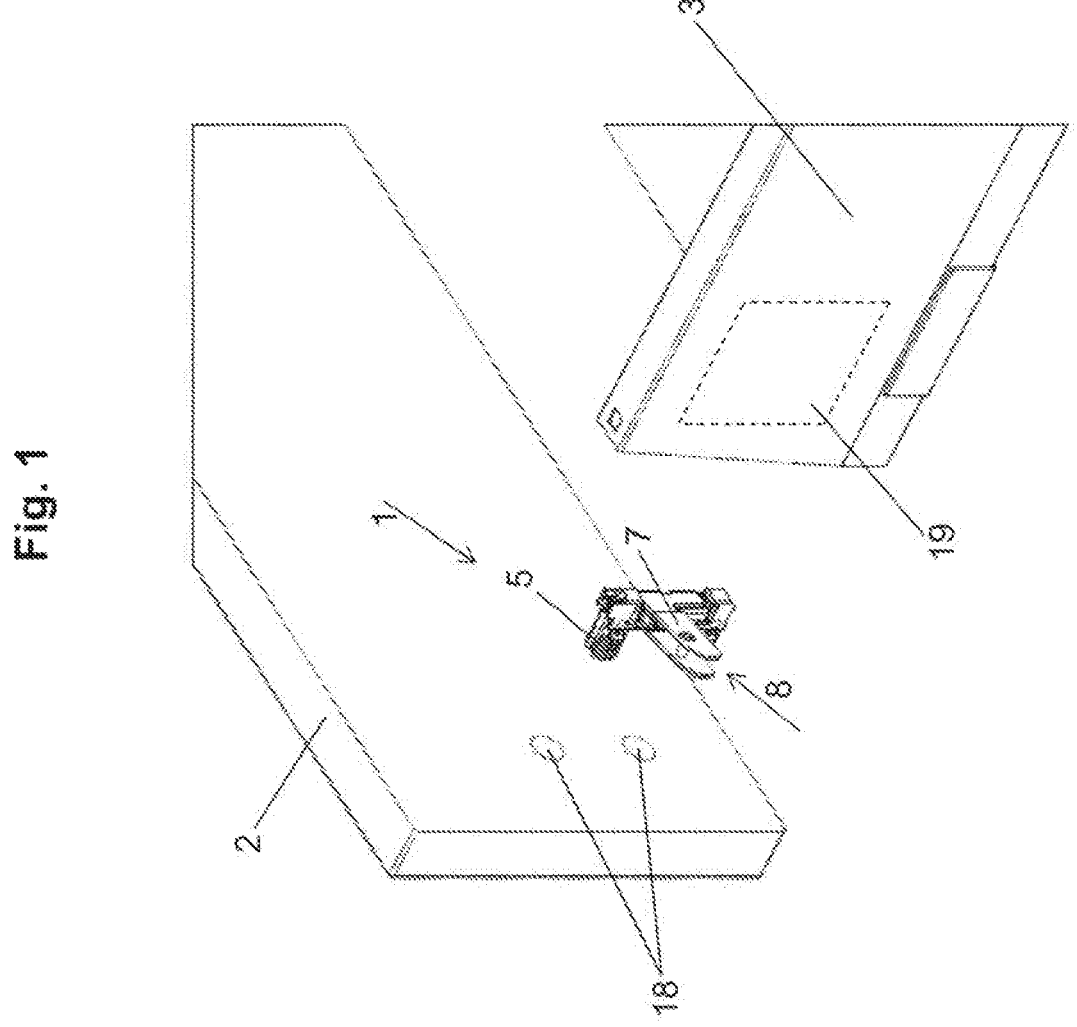
FIG. 1 is an exploded view of two furniture parts to be connected with an embodiment of a furniture fitting according to the invention.

FIG. 1 shows an exploded view of two furniture parts to be connected, by means of an embodiment of a furniture fitting 1 according to the invention. More precisely the two furniture parts to be connected are a front panel 2 and a side wall 3 of a drawer 17, wherein the furniture fitting 1 is introduced with the dowels 5 for connection purposes into the bores 18 provided for that purpose in the front panel 2. That is made possible by the first release position of the furniture fitting 1, shown in FIG. 1, with the dowels 5 being released. In addition the furniture fitting 1 shown here has a connecting device 8 having a pin. The connecting device 8 can be locked by a locking device 19 in the side wall 3 of the drawer 17. Such a locking device 19 is already known in the state of the art. The locking device 19 usually has a hook element which can be releasably locked to the connecting device 8.

The first release position of the furniture fitting 1 is clearly visible in FIG. 1, in which the fitting body 7 of the furniture fitting 1 is inclined towards the left. That fitting body 7 is rotatably or pivotably connected to the dowels 5, in which case spreader elements 6 arranged in the interior of the dowels 5 (see, e.g., FIG. 6) are movable in the axial direction of the dowels 5 by a rotary or pivotal movement of the fitting body 7 and thus the dowels 5 can be moved between a clamping position and a release position. That is described in detail in the Figures hereinafter.

FIG. 2a shows an embodiment of a furniture fitting 1 according to the invention in conjunction with a front panel 2 in a first release position. In this case, the furniture fitting 1, as already shown in FIG. 1, is introduced with its dowels 5 into the bores 18 provided for same in the front panel 2 and remains in a first release position.

FIG. 2b shows a detail view of the furniture fitting 1 in conjunction with the front panel 2 of FIG. 2a.

FIG. 2c shows a perspective view of the furniture fitting 1 of FIG. 2a in a first release position. It can be clearly seen here that the furniture fitting 2 has two dowels 5 connected to a carrier 10. The furniture fitting 1 has a fitting body 7 connected rotatably or pivotably to the carrier 10. A connecting device 8 (in the form of a pin or bolt) is arranged on the fitting body 7. In this case the dowels 5 have a central axis 22.

In FIG. 3a, the embodiment according to the invention of FIG. 2a has been moved by a rotary or pivotal movement of the fitting body 7 in a first actuation direction 9 into a clamping position whereby the dowels 5 are clamped by the spreader elements 6 and the furniture fitting 1 and the front panel 2 are connected together. The fitting body 7 has been rotated or pivoted about an axis of rotation 11 (see, e.g., FIGS. 7a, 8a, and 9a) in a first actuation direction 9, the axis of rotation 11 being disposed transversely relative to the central axes 22 of the dowels 5. More precisely in this embodiment, the axis of rotation 11 is at a right angle to the central axes 22 of the dowels 5.

FIG. 3b shows a detail view of the furniture fitting 1 of FIG. 3a which is in a clamping position.

FIG. 3c shows a perspective view of the furniture fitting 1 of FIGS. 3a and 3b whereby it is possible to see the individual parts (dowels 5, carrier 10, fitting body 7 and connecting device 8) of the furniture fitting 1. It is also possible to see in this view how the dowels 5 are in a spread-open state in the clamping position.

FIG. 4a shows the embodiment according to the invention of a furniture fitting 1 of FIGS. 3a to 3c, wherein the fitting body 7 has been moved by a rotary or pivotal movement in a first actuation direction 9 into a second release position, in which case the furniture fitting 1 is admittedly still arranged with its dowels 5 in the bores 8 of the front panel 2 but is no longer held by expansion of the dowels 5 in the bores 18.

In this case the fitting body 7 was again rotated or pivoted in a first actuation direction 9 about an axis of rotation 11 which is disposed transversely relative to the central axes 22 of the dowels 5.

FIG. 4b shows a detail view of the furniture fitting 1 in FIG. 4a.

FIG. 4c shows a view of the furniture fitting 1 in a second release position, wherein it is once again clearly possible to see the connecting device 8 on the fitting body 7, the fitting body 7 being connected rotatably or pivotably to the carrier 10, with the carrier 10 being connected to the two dowels 5. It can be clearly seen from this Figure that the dowels 5 are in a released (non-expanded) position.

Figure 5:
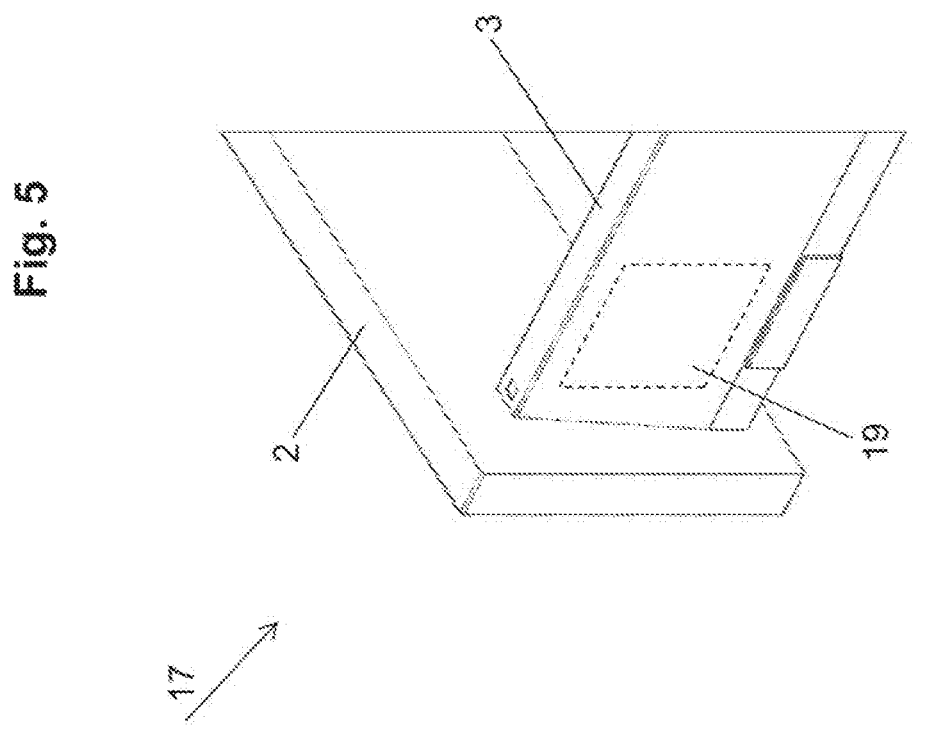

FIG. 5 shows a connection between two furniture parts by means of an embodiment of a furniture fitting 1 according to the invention. In this arrangement the furniture fitting 1 which is connected to the front panel 2 by a clamping position (as shown in FIGS. 3a and 3b) is pushed into the locking device 19 of the side wall 3 and locked by the locking device 19.

FIG. 6 shows an exploded view of an embodiment of a furniture fitting 1 according to the invention. It has a carrier 10 to which two dowels 5 are fixed. The spreader elements 6 (wherein a respective spreader element 6 is associated with each dowel 5) have at one end spreader cams 20. In an assembled state, the spreader elements 6 are disposed in the interior of the dowels 5, with their limb, at the end of which the spreader cams 20 are disposed. The other end of the spreader elements 6 having an L-shaped configuration is fixed in a fixing part 15. In this embodiment, the fitting body 7 is formed by the fixing part 15 and a guide part 16, the guide part 15 carrying a connecting device 8 in the form of a pin. In the assembled state, the fixing part 15 is inserted into the guide part 16. In the assembled state, the carrier 10 is guided or held on the guide part 16 by the spreader elements 6, more precisely by the spreader cams 20 arranged in the dowels 5, by way of the fixing part 15, whereby a rotary or pivotal movement of the fitting body 7, more precisely of the fixing part 15 and the guide part 6, in relation to the dowels 5 or the carrier 10, is made possible. In this case, the limbs of the spreader element 6 allow a translatory movement of the dowels 5 and the carrier 10 connected to the dowels 5. The dowels 5 have a central axis 22.

FIG. 7a, FIG. 8a and FIG. 9a again have the embodiment already described above of a furniture fitting 1 according to the invention. Starting from a first release position, as shown in FIG. 7a, the furniture fitting 1 is movable by a rotary or pivotal movement in the first actuation direction 9 into a clamping position (shown by FIG. 8a). The furniture fitting 1 is movable into a second release position by continuation of the rotary or pivotal movement of the fitting body 7 in the first actuation direction 9 (this is shown in FIG. 9a). The fitting body 7 was rotated or pivoted in the first actuation direction 9 about an axis of rotation 11 which is disposed transversely relative to the central axes 22 of the dowels 5. More precisely, in this embodiment the axis of rotation 11 is substantially at a right angle to the central axes 22 of the dowels 5.

The furniture fitting 1 shown in FIG. 7a is in a release position. FIG. 7b shows the section indicated in FIG. 7a. It can be clearly seen from the sectional view how the dowels 5 of the furniture fitting 1 are arranged in a bore 18 in a front panel 2. The spreader element 6 with the spreader cam 20 is arranged centrally in the dowels 5, with the spreader elements 6 being movable about an axis of rotation 11. The dowels 5 are connected to a carrier 10, the fitting body 7 bearing with its first contact surface 12 against the carrier 10. The fitting body 7 is arranged rotatably or pivotably about the axis of rotation 11. The dowels 5 are at a spacing d relative to the axis of rotation 11. The furniture fitting 1 can be moved from the first release position into a clamping position by a rotary or pivotal movement of the fitting body 7 in a first actuation direction 9.

That clamping position of the furniture fitting 1 is shown in FIG. 8a. Once again the indicated section in FIG. 8a is shown in FIG. 8b. FIG. 8b shows how the fitting body 7 was transferred from its first contact surface 12 to its second contact surface 13 on the carrier 10 by the rotary or pivotal movement of the fitting body 7 in a first actuation direction 9. The second contact surface 13 is at a greater spacing D relative to the axis of rotation 11 than the first contact surface 12 whereby the spreader elements 6 which are fixed to the fitting body 7 were moved axially in the dowel 5. More precisely: the spreader elements 6 were pulled with their spreader cams 20 into the interior of the dowels 5 whereby they spread the dowels 5 open. That is effected by the spacing d between the dowels 5 and the axis of rotation 11 (shown by FIG. 7b) having been increased to the spacing D (shown in FIG. 8b). By virtue of the spreading effect the dowel 5 is pressed with its peripheral surface against an inside of the bores 18 of the front panel 2 whereby the furniture fitting 1 is held to the front panel 2 by the compression forces operative between the dowels 5 and the bores 18.

By continuation of the rotary or pivotal movement of the fitting body 7 in the first actuation direction 9 the furniture fitting 1 is moved into a second release position different from the first one. That second release position of the furniture fitting 1 is shown in FIG. 9a.

Once again the section indicated in FIG. 9a is shown in FIG. 9b, wherein it can be seen that the fitting body 7 now bears with its third contact surface 14 against the carrier 10, with the third contact surface 14 in this embodiment being at a reduced spacing d relative to the axis of rotation 11 than the second contact surface 13. More precisely the third contact surface 14 is at the same spacing d relative to the axis of rotation 11 as the first contact surface 12. By virtue of that continuation of the rotary or pivotal movement of the fitting body 7 in the first actuation direction 9 the spacing D was reduced to a spacing d whereby the spreader elements 6—more precisely the spreader cams 20—are pushed out of the dowels 5 and the dowels 5 were released again.

FIG. 10a shows an embodiment of a furniture fitting 1 according to the invention in a clamping position. In this respect FIG. 10a shows a front view of the furniture fitting 1. FIG. 10a shows two dowels 5 connected to a carrier 10. The section B-B identified in FIG. 10a is shown by the view in FIG. 10b. It can be clearly seen from that sectional view how the carrier 10 which is connected to the dowels 5 bears against a second contact surface 13 of the fitting body 7. The carrier 10 in this case bears against a second contact surface 13 on the guide part 16 as the fitting body 7 in this embodiment is of a two-part structure consisting of the guide part 16 and the fixing part 15. The fixing part 15 which is arranged in the guide part 16 has an axis of rotation 11 about which the spreader element 6 is mounted rotatably.

FIG. 10c shows the detail view C from FIG. 10b, showing once again the carrier 10 bearing against a second contact surface 13 of the guide part 16. It can be clearly seen from this Figure that there is a spacing E between the axis of rotation 11 and the carrier 10 by virtue of the carrier 10 bearing against the second contact surface 13.

By virtue of rotation or pivotal movement of the fitting body 7 in a first actuation direction 9, more precisely by rotary or pivotal movement of the guide part 16 and the fixing part 15 connected thereto in a first actuation direction 9, the furniture fitting 1 shown in FIGS. 10a to 10c can be transferred into a second release position as shown in FIG. 11a.

It can be clearly seen from FIG. 11a how the dowels 5 and the carrier 10 connected thereto are now in a pivoted or tilted position relative to the fitting body 7. FIG. 11b shows the section B-B indicated in FIG. 11a. The illustrated detail C of FIG. 11b is shown by FIG. 11c. FIG. 11c shows how the carrier 10 bears against a third contact surface 14 of the guide part 16 and thereby is at a spacing e relative to the axis of rotation 11, that spacing e representing a reduced spacing relative to the spacing E. The spreader element 6 is again mounted at the axis of rotation 11, more precisely in the fixing part 15, with the fixing part 15 being accommodated by the guide part 16. The fixing part 15 and the guide part 16 jointly form the fitting body 7.

By virtue of the rotary or pivotable mounting of the spreader element 6 it can be moved with a rotary movement in a rotary or pivotal movement of the fitting body 7, more precisely of the fixing part 15 and the guide part 16. Because a spacing e is altered by a rotary or pivotal movement between the carrier 10 or the dowels 5 and the axis of rotation 11 the spreader element 6 of an L-shaped configuration is displaced in an axial direction in the dowel 5. Spreading or release of the dowel 5 can be implemented by that axial displacement of the spreader element 16. In this embodiment that is achieved by the dowel 5 being of a slit configuration, with the spreader element 6 at its free end (which projects through the dowel 5) having a spreader cam 20. When now that spreader cam 20 is pushed into the dowel 5 by the spreader element 6 the slit dowel 5 is expanded and its peripheral surface is enlarged. When now that dowel 5 is arranged in a bore 18 provided for same a compression force is built up by spreading of the dowel 5 between the bore 18 and the peripheral surface of the dowel 5. When now the spreader cam 20 or the spreader element 6 is pushed out of the dowel 5 again then the dowel 5 springs back into its initial position and reduces the size of its peripheral surface, whereby it is again possible to remove the dowel 5 from a bore 18 with little effort. That resilient return movement of the dowel 5 can be achieved by a suitable choice of material for the dowel 5, in which respect care is to be taken to ensure that spreading of the dowel 5 always takes place in an elastic deformation range whereby the dowel 5 resiliently returns to its initial position again by virtue of its own forces when the force is removed (removal of the spreader element 6).

It can further be provided that the fitting body 7 has a predefined latching relation in relation to the at least one dowel 5 at least in the clamping position, preferably also in the first and the second release positions. That can be clearly seen in FIGS. 10a to 10c and FIGS. 11a to 11c, wherein an eccentric rounded edge 21 is provided between the first contact surface 12 and the second contact surface 13 and between the second contact surface 13 and the third contact surface 14 of the guide part 16. Upon a rotary or pivotal movement between the first contact surface 12 and the second contact surface 13 or the second contact surface 13 and the third contact surface 14 the carrier 10 which bears against the contact surface now has to be moved over that eccentric rounded edge 21 whereby the spreader element 6 in the dowel 5—more precisely the spreader cam 20—is pushed into the dowel 5. As the dowel 5 experiences elastic deformation however that dowel 5 exerts a spring-back force on the spreader element 6 as the dowel 5 always has a tendency to return to its initial position. When now that eccentric rounded edge 21 is overridden the spacing is reduced again and the spreader element is pushed a little out of the interior of the dowel 5 or is urged out by the dowel 5 by virtue of its resilient return action. This means that the smallest spacing relative to the axis of rotation 11 is always in the middle of the contact surfaces 12, 13, 14. If a carrier 10 bearing against a contact surface is moved out of that middle position of the contact surfaces 12, 13, 14 the respective spacing is increased. As however the dowel 5 has a resilient return action it is always caused to assume a position involving the smallest possible spacing between the carrier 10 and the axis of rotation 11 whereby a predefined latching position is always respectively provided in the middle of the contact surfaces 12, 13, 14. The fitting body 7 is rotated or pivoted in a first actuation direction 9 about an axis of rotation 11 which is transverse relative to the central axis 22 of the dowel 5. More precisely the axis of rotation 11 in this embodiment is substantially at a right angle to the central axes 22 of the dowels 5.

FIGS. 12a to 14b show an embodiment of a furniture fitting 1 according to the invention, the fitting body 7 being in the form of a holding part for a drawer rail 4. FIG. 12a shows the fitting body 7 in a first release position. By virtue of a rotary or pivotal movement of the fitting body 7 which in FIG. 12a is in a first release position in a first actuation direction 9 the dowel 5 can be moved into a clamping position as shown in FIG. 13a. By continuation of the rotary or pivotal movement of the fitting body 7 in the first actuation direction 9 the dowel 5, starting from the clamping position, can be moved into a second release position different from the first release position. That second release position is shown in FIG. 14a. The detail views A indicated in FIGS. 12a, 13a and 14a are respectively shown by FIGS. 12b, 13b and 14b.

In greater detail FIG. 12b shows the dowel 5 in a first release position. The dowel 5 is fixed to a carrier 10 bearing against a fitting body 7. This embodiment has the same functionality as in the above-described Figures, wherein once again arranged in the dowel 5 is a spreader element 6 of L-shaped configuration, which is axially displaceable in the dowel 5. That L-shaped spreader element 6 is further fixed pivotably in the fitting body 7. This embodiment also has (more precisely, the fitting body 7) a first contact surface 12, a second contact surface 13 and a third contact surface 14, wherein at least two of the contact surfaces 12, 13, 14 are at a spacing d, D different relative to the axis of rotation 11. More precisely the first contact surface 12 and the third contact surface 14 are at the same reduced spacing d. The second contact surface 13 involves an enlarged spacing D. In the position shown in FIG. 12b the carrier 10 is against a first contact surface 12 with a spacing d whereby the spreader element 6 is disposed with its spreader cam 20 arranged at its free end, in an extended position in the dowel 5, with the dowel 5 remaining in a first release position.

FIG. 13b shows a clamping position of the dowel 5 as can be seen from the spread-open shape of the dowel 5. For that purpose the fitting body 7 was rotated or pivoted in a first actuation direction 9 relative to the carrier 10, in which case the carrier 10 now bears against a second contact surface 13 of the fitting body 7 which is at an increased spacing D relative to the axis of rotation 11. By virtue of that increased spacing D the spreader element 6 is pulled into the interior of the dowel 5 whereby the spreader cam 20 fixed at the free end of the spreader element 6 spreads the dowel 5.

By virtue of continuation of the rotary or pivotal movement of the fitting body 7 in a first actuation direction 9 the dowel 5 can again be transferred from the clamping position into a second release position as shown in FIG. 14b. In that respect it can be clearly seen how the carrier 10 now bears against a third contact surface 14 of the fitting body 7, which third contact surface 14 is at a spacing d which is again reduced in relation to the axis of rotation 11 whereby the spreader element 6 is pushed out of the dowel 5 and the dowel 5 springs back into its initial position (or also a second release position).

In FIGS. 12a to 14b the fitting body 7 is formed in one piece with an internal part of the drawer rail 4. The drawer rail 4 can be connected with its end opposite the dowel 5—as is known from the state of the art—to a counterpart component. In that case a drawer rail 4 can connect two parts of a drawer 17 and possibly extend parallel to and above a side wall 3 of a drawer 17.

LIST OF REFERENCES

1 furniture fitting
2 front panel
3 side wall of a drawer
4 drawer rail
5 dowel
6 spreader element
7 fitting body
8 connecting device
9 actuation direction
10 carrier
11 axis of rotation
12 contact surface
13 contact surface
14 contact surface
15 fixing part
16 guide part
17 drawer
18 bore
19 locking device
20 spreader cam
21 edge
22 central axis
d spacing
D spacing
e spacing
E spacing

The invention claimed is:

1. A furniture fitting for connecting two furniture parts, the furniture fitting comprising:
    a dowel for fixing the furniture fitting to a first one of the two furniture parts,
    a spreader element mounted movably relative to the dowel, wherein the dowel is transferable from a first release position into a clamping position by a relative movement of the spreader element, and
    a fitting body having a connecting device for connecting the furniture fitting to a second one of the two furniture parts,
    wherein the spreader element is rotatably mounted to the fitting body and is axially displaceable within the dowel,
    wherein the fitting body is connected to the spreader element such that:
        the dowel is movable from the first release position into the clamping position by a rotary or pivotal movement of the fitting body in a first actuation direction and by a resulting axial movement of the spreader element, and
        the dowel is movable from the clamping position into a second release position different from the first release position by a continuation of the rotary or pivotal movement of the fitting body in the first actuation direction.

2. The furniture fitting according to claim 1, wherein the dowel has a central axis, and the fitting body is rotatable or pivotable about an axis of rotation in the first actuation direction, wherein the axis of rotation is arranged transversely to the central axis.

3. The furniture fitting according to claim 2, wherein the axis of rotation is arranged at a right angle to the central axis.

4. The furniture fitting according to claim 1, wherein the spreader element has a spreader cam arranged in the dowel.

5. The furniture fitting according to claim 4, wherein the spreader cam is located at a free end of the spreader element.

6. The furniture fitting according to claim 1, wherein the spreader element is in the form of an L-shaped member having a first limb guided axially in the dowel and a second limb mounted rotatably in the fitting body.

7. The furniture fitting according to claim 1, wherein the dowel is connected to a carrier, and the spreader element is mounted to the fitting body rotatably about an axis of rotation.

8. The furniture fitting according to claim 7, wherein the fitting body has three contact surfaces, a first one of the three contact surfaces bearing against the carrier depending on a position of the fitting body, and a second one and a third one of the three contact surfaces being at a different spacing relative to the axis of rotation.

9. The furniture fitting according to claim 1, wherein a spacing between an axis of rotation, the spreader element being mounted rotatably in the fitting body along the axis of rotation, and the dowel is increasable or reduceable by a rotary or pivotal movement of the fitting body relative to the dowel.

10. The furniture fitting according to claim 1, wherein the fitting body includes a fixing part for fixing the spreader element and a guide part bearing against the dowel and/or a carrier, the carrier being connected to the dowel.

11. The furniture fitting according to claim 1, wherein the fitting body has a predefined latching position with respect to the dowel at least in the clamping position.

12. The furniture fitting according to claim 11, wherein the fitting body also has a predefined latching position with respect to the dowel in the first release position and in the second release position.

13. The furniture fitting according to claim 1, wherein the fitting body is a holding part for holding a front panel of a drawer.

14. The furniture fitting according to claim 1, wherein the fitting body is a holding part for holding a drawer rail.

15. An article of furniture comprising:

at least two furniture parts; and the furniture fitting according to claim 1 connecting together the at least two furniture parts.

\* \* \* \* \*